United States Patent [19]
Giammanco

[11] Patent Number: 5,577,119
[45] Date of Patent: Nov. 19, 1996

[54] TENSION RESISTING BRACKET FOR TELEPHONE HANDSETS

[75] Inventor: Anthony Giammanco, Staten Island, N.Y.

[73] Assignee: I.D. Tel Corp., Staten Island, N.Y.

[21] Appl. No.: 436,884

[22] Filed: May 8, 1995

[51] Int. Cl.⁶ .................................................. H04M 1/00
[52] U.S. Cl. .......................... 379/438; 379/437; 379/451
[58] Field of Search .................................. 379/438, 437, 379/451, 447, 145; 439/449, 451; 174/135, 138 G; 248/56, 65; 24/129 B, 129 A, 128, 116 A

[56] References Cited

U.S. PATENT DOCUMENTS

| | | | |
|---|---|---|---|
| 3,302,912 | 7/1965 | Hurlburt, Jr. | 248/65 |
| 4,177,362 | 12/1979 | Boenecke | 179/186 |
| 4,518,830 | 5/1985 | Drexler et al. | 179/103 |
| 4,837,815 | 6/1989 | Brancati | 379/438 |
| 4,845,774 | 6/1989 | Arzounian | 379/433 |
| 5,007,079 | 4/1991 | Vogl et al. | 379/438 |
| 5,018,185 | 5/1991 | Riddle | 379/145 |
| 5,086,465 | 2/1992 | Bass | 379/438 |
| 5,136,635 | 8/1992 | Stuggs | 379/145 |
| 5,315,648 | 5/1994 | Vogl | 379/438 |

*Primary Examiner*—Krista M. Zele
*Assistant Examiner*—Jack Chiang
*Attorney, Agent, or Firm*—Charles E. Temko

[57] ABSTRACT

A metal tension resisting bracket for use with public telephone pay stations and the like which anchors the distal end of an armored connecting cable within the telephone cabinet. The bracket provides for rapid disconnection of both the distal end of the armored cable and the internally contained lanyard which resists tension applied to the cable.

2 Claims, 2 Drawing Sheets

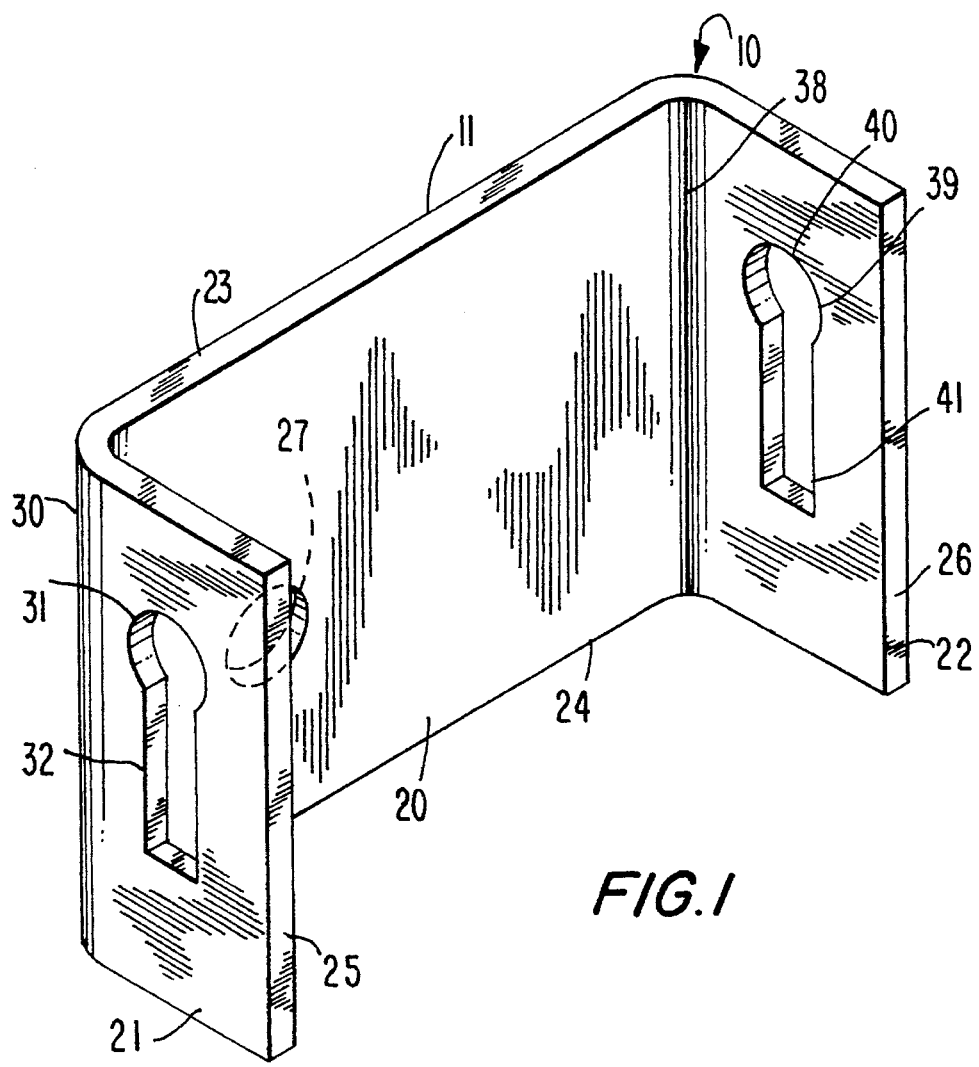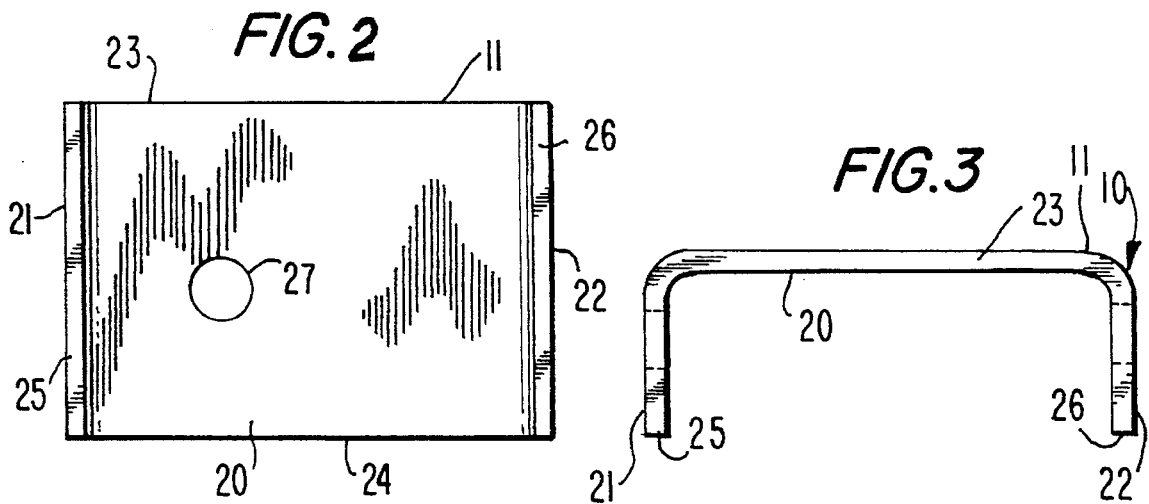

TENSION RESISTING BRACKET FOR TELEPHONE HANDSETS

BACKGROUND OF THE INVENTION

This invention relates generally to the field of public telephone pay stations, and more particularly to an improved construction for anchoring the armored cable normally used to interconnect a handset component of such pay station to the fixed cabinet which contains the remaining components of the station.

While most telephone handsets are interconnected to the base of the instrument using a flexible plastic covered cable, the relatively rough usage, often destructive, to which public pay stations are subjected, has necessitated the placing of the cable within a spirally wound metallic shield anchored at one end to the telephone handset, and at the other end within the telephone cabinet. The metallic shield discourages breaking or cutting of the cable, but the cable can be unwound with the application of excessive axially directed force. This force is resisted by providing a non-conductive flexible lanyard which is anchored at separate points to the handset and the cabinet, and is contained within the shield.

In spite of the above provisions, the rate of attrition of handsets over relatively short periods of time is often considerable, and when a handset becomes unserviceable, the usual procedure is to replace the same on the site with another functioning handset. The disconnection of the electrical contacts, the ends of the cable, and the lanyard, and the reconnection of the replacement handset can often require a substantial period of time invested by service personnel.

SUMMARY OF THE INVENTION

Briefly stated, the invention contemplates the provision of an improved tension absorbing bracket to be installed within the telephone cabinet adjacent an opening therein through which the cable passes. The bracket, preferably in the form of a metallic stamping, includes means for mounting the bracket in fixed relation relative to the cabinet at a medially positioned base portion thereof, a first flange or wall extending from the base portion at an angle therefrom, and forming a first elongated keyhole slot which receives an enlarged end of the lanyard for convenient detachment by a service person, and a second flange, generally parallel to the first flange containing a second elongated keyhole slot for engaging the corresponding end of the metallic cable. To prevent unwanted disconnection of either the lanyard or the cable, there is provided an elongated split pin which engages the slotted openings in the first and second flanges to block the ends of the openings until replacement of the handset is required.

BRIEF DESCRIPTION OF THE DRAWINGS

In the drawings, to which reference will be made in the specification, similar reference characters have been employed to designate corresponding parts throughout the several views.

FIG. 1 is a view in perspective of a bracket element forming a part of the disclosed embodiment.

FIG. 2 is a side elevational view thereof.

FIG. 3 is a top plan view thereof.

DETAILED DESCRIPTION OF THE DISCLOSED EMBODIMENT

Figure 4:
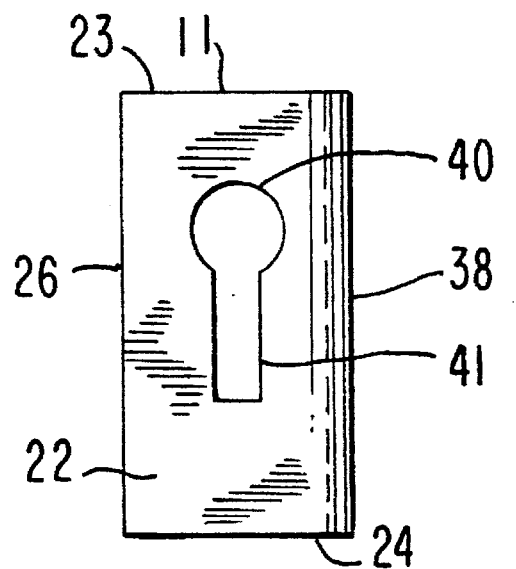
FIG. 4 is an end elevational view thereof.

In accordance with the invention, the device in FIGS. 1–4, generally indicated by reference character 10, comprises broadly: a fixed bracket element 11 and a selectively engageable spring clip element 12.

The bracket element 11 is most conveniently formed as a metallic stamping from relatively heavy gauge metal, and is of generally U-shaped configuration. It includes a base wall 20, a first side wall 21, and a second side wall 22, said walls being bounded by a continuous upper edge 23 and a continuous lower edge 24, as well as first and second free edges 25 and 26. The base wall 20 is provided with a mounting hole 27 by means of which the same can be bolted to a vertical wall of a telephone cabinet, in known manner.

The first side wall 21 interconnects with the base wall 20 at a fold edge 30, and is provided with a keyhole-shaped opening including an enlarged entrance 31 to a vertically oriented slot 32, of somewhat lesser width. The second side wall 22 interconnects with the base wall 20 at a fold edge 38, and is provided with a second keyhole opening 39 including an entrance 40 and a slot 41.

Figure 5:
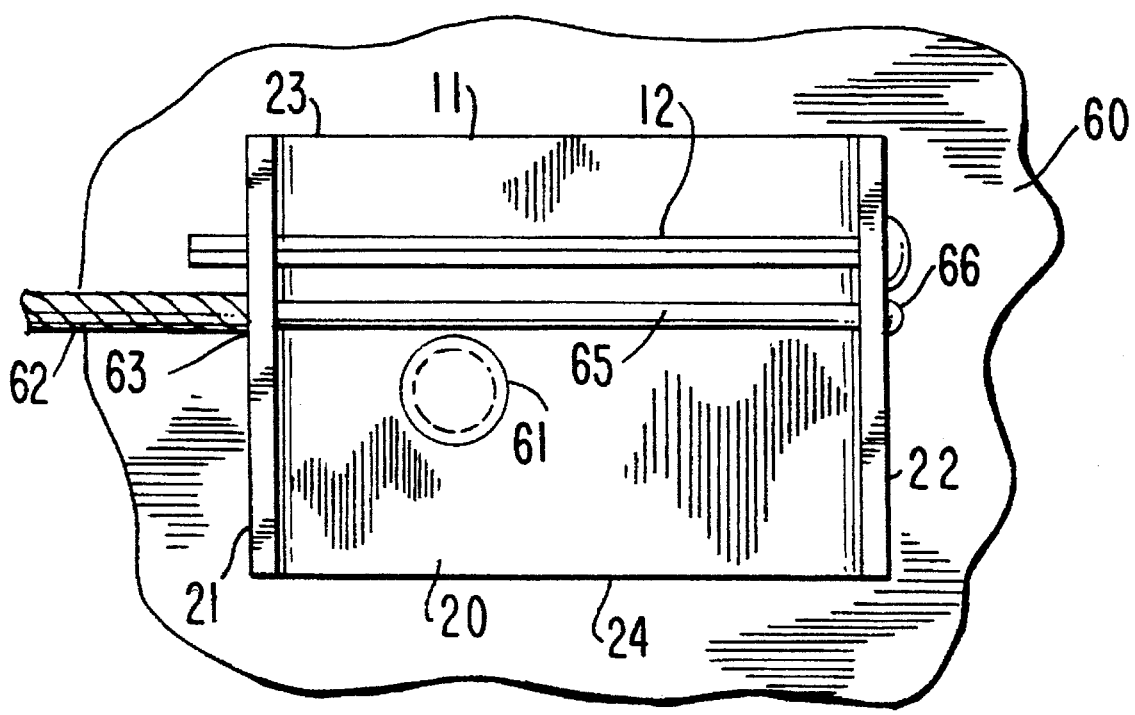
FIG. 5 is a fragmentary side elevational view showing the device in engaged condition within a telephone cabinet with the end of a armored cable and lanyard.

Referring to FIG. 5 in the drawing, reference character 60 designates a vertical wall of a conventional pay station telephone box. A bolt 61 penetrates the hole 27 to enable the bracket element 11 to be fixed thereto.

Extending from a conventional handset is an armored cable 62 which penetrates an opening (not shown) in the box wherein the free end 63 may be interconnected. As is known in the art, the cable 62 includes an outer metallic sheath formed of spiral convolutions which can normally resist transverse forces, but which can be unwound upon the occurrence of excess axially applied forces. This is prevented by the provision of a known non-conducting lanyard 65 which, in the prior art, is anchored to a fixed point in the telephone box.

In the present construction, the end of the lanyard 65 is passed through the entrance 31 into the slot 32 in such manner that an enlargement 66 is engaged to be thereby anchored. The free end of the cable 62 is passed through the entrance 31 and pushed downwardly into the slot 32 to be frictionally retained.

The spring clip element 12 is most conveniently in the form of a clevis pin approximately two and one-half inches in length and of diameter corresponding to that of the diameters of the openings 31 and 39 wherein it may be inserted through both openings to block possible movement of the armored cable and lanyard lodged in the slots 32 and 41.

When the handset is to be replaced, removal of the spring clip element 12 permits easy disengagement of both the lanyard and the free end of the sheath for replacement by similar elements on the replacement handset, the entire operation normally requiring less than one minute to perform by service personnel.

I wish it to be understood that I do not consider the invention to be limited to the precise details of structure shown and described in the specification, for obvious modifications will occur to those skilled in the art to which the invention pertains.

What is claimed is:

1. A tension resisting bracket for the detachable retention of an end of an armored length of telephone cable interconnecting a handset to a telephone box, said bracket being installed upon an inner surface of said telephone box, and comprising: a generally U-shaped body including a base wall and first and second side walls; said base wall having an opening therethrough adapted to be penetrated by a mounting bolt to secure said base wall to the interior of said telephone box; said first side wall having a first keyhole-shaped opening therein for reception of an end of a non-conductive lanyard forming a part of said cable, said second side wall having a second keyhole-shaped opening therethrough including a larger circular portion and a smaller slotted portion extending therefrom for the reception of a free end of the outer sheath of said cable, and the frictional retention of an end segment of the cable upon engagement within said slotted portion.

2. A bracket in accordance with claim 1, further comprising an elongated flexible spring clip in the form of a clevis pin of length sufficient to span the distance between said first and second side walls, said pin selectively engaging each of said keyhole-shaped openings through the larger circular portion thereof to inhibit disengagement of said outer sheath and lanyard of said cable from the bracket.

* * * * *